United States Patent
Liu et al.

(10) Patent No.: US 12,200,835 B1
(45) Date of Patent: Jan. 14, 2025

(54) LED LIGHT SOURCE RECOGNITION METHOD, DEVICE, APPARATUS AND MEDIUM BASED ON DEEP LEARNING

(71) Applicant: Hubei University of Economics, Hubei (CN)

(72) Inventors: Wenping Liu, Hubei (CN); Sihan Li, Hubei (CN); Yufu Jia, Hubei (CN); Qian Deng, Hubei (CN); Zhenjiang Liu, Hubei (CN); Minglei Li, Hubei (CN); Yamin Li, Hubei (CN)

(73) Assignee: Hubei University of Economics, Hubei (CN)

( * ) Notice: Subject to any disclaimer, the term of this patent is extended or adjusted under 35 U.S.C. 154(b) by 0 days.

(21) Appl. No.: 18/646,707

(22) Filed: Apr. 25, 2024

(30) Foreign Application Priority Data

Jan. 23, 2024 (CN) .......................... 202410088953.1

(51) Int. Cl.
| | |
|---|---|
| H05B 47/10 | (2020.01) |
| G06T 7/11 | (2017.01) |
| G06T 9/00 | (2006.01) |
| H05B 45/12 | (2020.01) |
| H05B 47/165 | (2020.01) |

(52) U.S. Cl.
CPC ................ H05B 45/12 (2020.01); G06T 7/11 (2017.01); G06T 9/002 (2013.01); H05B 47/165 (2020.01); G06T 2207/10004 (2013.01)

(58) Field of Classification Search
CPC .. H05B 47/115; H05B 47/125; H05B 47/165; G06T 7/11; G06T 7/246; G06T 7/248; G06T 7/596; G06T 9/002; G06T 2207/10004; G06T 2207/10152
See application file for complete search history.

(56) References Cited

U.S. PATENT DOCUMENTS

| | | | |
|---|---|---|---|
| 10,750,113 B2* | 8/2020 | Takahashi .......... | H04N 21/4316 |
| 2006/0028552 A1* | 2/2006 | Aggarwal ........ | G08B 13/19673 |
| | | | 348/169 |
| 2015/0190051 A1* | 7/2015 | Rajan ...................... | G06T 7/246 |
| | | | 348/78 |
| 2019/0045601 A1* | 2/2019 | Beghelli ................ | H05B 47/11 |
| 2022/0012899 A1* | 1/2022 | Peppoloni ............... | G06T 7/246 |
| 2023/0306637 A1* | 9/2023 | Zhang ..................... | G06N 3/09 |
| 2024/0137646 A1* | 4/2024 | Kim ..................... | H04N 23/633 |

* cited by examiner

Primary Examiner — Tung X Le
(74) Attorney, Agent, or Firm — JCIPRNET

(57) ABSTRACT

The disclosure provides an LED light source recognition method, device, apparatus, and medium based on deep learning, belonging to the field of indoor positioning and navigation technology. The method includes the following. In an LED lighting environment, a spline frame is obtained through a CMOS camera, in which the spline frame is an image having dark stripes. The spline frame is input to a target detection model, a dark stripe detection result output by the target detection model is obtained. The multiple rectangular boxes are preprocessed, and based on the predicted classification corresponding to each preprocessed rectangular box, an image feature encoding sequence of the spline frame is determined. The image feature encoding sequence is compared with a light source feature encoding sequence corresponding to each LED light source to determine the light source feature encoding sequence that best matches the spline frame.

19 Claims, 8 Drawing Sheets

Image feature encoding sequence  1111000000000000001111110000······

Align a first code in the image feature encoding sequence with a first code in the light source feature encoding sequence Light source feature encoding sequence  00000000000000001111111

Image feature encoding sequence  1111000000000000001111110000······

Align a first code in the image feature encoding sequence with a second code in the light source feature encoding sequence Light source feature encoding sequence  00000000000000001111111

Image feature encoding sequence  1111000000000000001111110000······

Align a first code in the image feature encoding sequence with a third code in the light source feature encoding sequence Light source feature encoding sequence  00000000000000001111111

FIG. 9

LED LIGHT SOURCE RECOGNITION METHOD, DEVICE, APPARATUS AND MEDIUM BASED ON DEEP LEARNING

CROSS-REFERENCE TO RELATED APPLICATION

This application claims the priority benefit of China application serial no. 202410088953.1, filed on Jan. 23, 2024. The entirety of the above-mentioned patent application is hereby incorporated by reference herein and made a part of this specification.

BACKGROUND

Technical Field

The disclosure belongs to the technical field of indoor positioning and navigation, and particularly relates to an LED light source recognition method, device, apparatus, and medium based on deep learning.

Description of Related Art

Indoor positioning is based on indoor location services. Conventional indoor positioning mainly relies on the construction of indoor floor plans and WiFi fingerprint matching. Due to the high cost of building and maintaining floor plans and the limitation of the low precision of positioning algorithms, it is difficult to apply this positioning method on a large scale in actual scenarios. The precision of indoor positioning is closely related to the beacons deployed in the indoor environment. For example, multiple Bluetooth beacons are placed indoors, and the position of the user is located by using the Bluetooth of the mobile phone to receive signals; or a certain number of radio frequency identification (RFID) readers and writers are configured indoors to locate the position of the user by reading the information on the tags; for another example, an ultrasonic transceiver is placed indoors to locate the position of the user based on the reflection of sound waves. All of the above types of beacons need to be additionally deployed in indoor environments, and costs of apparatus and deployment are increased. Since the light emitting diode (LED) light source has the advantages of low power consumption, long life, and green environmental protection, the functions of lighting and positioning communication may both be performed, the use thereof is becoming increasingly popular in lighting systems, and the LED light is a good choice as an indoor positioning beacon.

Currently, there are several ways to use LED lights to achieve indoor positioning. For example, a first way is multilateral positioning. The distance between the LED light and the receiver is measured, and position coordinates of the receiver are estimated and calculated with the help of the geometric relationship thereof. Typical ranging methods include, for example, time of arrival (TOA), time difference of arrival (TDOA), angle of arrival (AOA), and received signal strength (RSS). A second way is fingerprint recognition method. In the offline stage, fingerprint features such as light intensity, pulse response time, or extinction ratio of LED light signals are collected and processed. In the online stage, the receiver position is estimated by model matching through the nearest neighbor algorithm, naive Bayes algorithm or backpropagation (BP) neural network algorithm. A third way is the image sensor imaging method. This type of method is based on the pinhole imaging principle and estimates the position of the receiver with the help of relevant parameters of the image sensor and the relative position relationship between coordinates of the object point and the image point. Generally, the receiver uses a monocular camera or a binocular camera to image multiple LED lights.

The positioning methods generally require special design of the receiver. For example, the AOA method requires a special antenna array to support the receiver. For the TOA method, precise time synchronization between the receiver and the LED is required. For the fingerprint method, a lot of calibration is required in the early stage, the fingerprint map maintenance is complicated, and the receiver is complex to manufacture. For the imaging method, the calculation is complex, and the hardware complexity of the receiver is high. How to efficiently use LED lights for indoor positioning is a technical problem that needs to be solved urgently in the industry.

SUMMARY

In view of the defects of the related art, the purpose of the disclosure is to efficiently utilize LED lights for indoor positioning.

To achieve the above purpose, in the first aspect, the disclosure provides an LED light source recognition method based on deep learning, which includes the following.

In an LED lighting environment, a spline frame is obtained through a CMOS camera, and the spline frame is an image having dark stripes.

The spline frame is input to a target detection model, a dark stripe detection result output by the target detection model is obtained, the dark stripe detection result includes multiple rectangular boxes and a predicted classification corresponding to each rectangular box, and the rectangular boxes are configured to mark dark stripe located areas or non-dark stripe located areas.

The multiple rectangular boxes are preprocessed to obtain multiple preprocessed rectangular boxes, and the respective preprocessed rectangular boxes do not overlap with or separate from each other.

Based on the predicted classification corresponding to each preprocessed rectangular box, an image feature encoding sequence of the spline frame is determined.

The image feature encoding sequence is compared with a light source feature encoding sequence corresponding to each LED light source to determine the light source feature encoding sequence that best matches the spline frame, and the light source feature encoding sequence is configured to mark the LED light source.

Each LED light source in the LED lighting environment performs lighting based on a switching frequency $f_i$ and a duty cycle, i represents a given number of the LED light source, different LED light sources use different switching frequencies, different LED light sources use different duty cycles, $f_i < W/S$, S represents the shutter duration of the CMOS camera, the CMOS camera collects the image in a column-by-column scanning manner, W represents the width of the image collected by the CMOS camera, and the light source feature encoding sequence corresponding to the LED light source is determined based on the shutter duration, the image width, and the switching frequency and the duty cycle used by the LED light source.

Optionally, preprocessing the multiple rectangular boxes to obtain the multiple preprocessed rectangular boxes includes the following.

Normalization processing is performed on the multiple rectangular boxes to obtain multiple normalized rectangular boxes.

Along an image width coordinate axis, the multiple normalized rectangular boxes are arranged sequentially in an ascending order to obtain a rectangular box sequence.

Based on the rectangular box sequence, a rectangular box removal process is performed to obtain a rectangular box sequence after the removal process, the rectangular box removal process is configured to remove a rectangular box with a small mean average precision in a target adjacent group for each target adjacent group, and the target adjacent group includes two adjacent rectangular boxes and the two rectangular boxes have the same predicted classification.

Based on the rectangular box sequence after the removal process, an elimination process is performed on overlapping areas or separation areas to obtain the multiple preprocessed rectangular boxes.

Optionally, performing the elimination process on the overlapping areas or the separation areas based on the rectangular box sequence after the removal process to obtain the multiple preprocessed rectangular boxes includes the following.

For any two adjacent rectangular boxes in the rectangular box sequence after the removal process, when the two rectangular boxes are overlapped on the image width coordinate axis, a rear boundary of a former rectangular box in the two rectangular boxes is moved forward along the image width coordinate axis, and a distance moved forward is $$W_{overlap} \times \frac{mAPbefore}{mAPbefore + mAPafter}.$$

A front border of a latter rectangular box in the two rectangular boxes is moved backward along the image width coordinate axis, and a distance moved backward is $$W_{overlap} \times \frac{mAPafter}{mAPbefore + mAPafter}.$$

In the formula, $W_{overlap}$ represents a width of an overlapping area between the two rectangular boxes, mAPbefore represents a mean average precision of the former rectangular box, and mAPafter represents a mean average precision of the latter rectangular box.

Optionally, performing the elimination process on the overlapping areas or the separation areas based on the rectangular box sequence after the removal process to obtain the multiple preprocessed rectangular boxes includes the following.

For any two adjacent rectangular boxes in the rectangular box sequence after the removal process, when the two rectangular boxes are separated on the image width coordinate axis, a rear boundary of a former rectangular box in the two rectangular boxes is moved backward along the image width coordinate axis, and a distance moved backward is $$W_{Separation} \times \frac{mAPbefore}{mAPbefore + mAPafter}.$$

A front border of a latter rectangular box in the two rectangular boxes is moved forward along the image width coordinate axis, and a distance moved forward is $$W_{Separation} \times \frac{mAPafter}{mAPbefore + mAPafter}.$$

In the formula, $W_{Separation}$ represents a width of a separation area between the two rectangular boxes, mAPbefore represents a mean average precision of the former rectangular box, and mAPafter represents a mean average precision of the latter rectangular box.

Optionally, determining the image feature encoding sequence of the spline frame based on the predicted classification corresponding to each preprocessed rectangular box includes the following.

Along the image width coordinate axis, a width of each preprocessed rectangular box is adjusted to obtain multiple width-adjusted rectangular boxes, the width adjustment is configured to adjust front and rear boundaries of the preprocessed rectangular boxes, box.

$$x_{new} = \frac{box.x_{old} \times W}{length},$$

box.$x_{old}$ is coordinates of a target boundary before the width of the preprocessed rectangular box is adjusted, box.$x_{new}$ is coordinates of a target boundary after the width of the preprocessed rectangular box is adjusted, the target boundary is the front boundary or the rear boundary, W is the image width, and length represents coordinate values of a rear boundary of a last preprocessed rectangular box.

Based on the width and the predicted classification corresponding to each width-adjusted rectangular box, a feature encoding sequence corresponding to each width-adjusted rectangular box is determined.

The feature encoding sequences corresponding to the respective width-adjusted rectangular boxes are integrated to determine the image feature encoding sequence of the spline frame.

Optionally, comparing the image feature encoding sequence with the light source feature encoding sequence corresponding to each LED light source to determine the light source feature encoding sequence best matching the spline frame includes the following.

For the light source feature encoding sequence corresponding to each LED light source, a similarity analysis is performed to determine a similarity between the light source feature encoding sequence corresponding to each LED light source and the image feature encoding sequence.

Based on the similarity between the light source feature encoding sequence corresponding to each LED light source and the image feature encoding sequence, a light source feature encoding sequence best matching the spline frame is determined.

The similarity analysis specifically includes the following.

For each target code in the light source feature encoding sequence, the target code is aligned with a first code of the image feature encoding sequence, the light source feature encoding sequence is used as content of a sliding window, at each window position, each code in the sliding window is compared with a code at a corresponding position in the image feature encoding sequence to see whether the codes are equal, a total quantity of times of the codes being equal is calculated and the total quantity is used as a similarity corresponding to the target code, the sliding window is configured to slide from a current window position to a next window position according to a target step size, and the target step size is equal to a length of the light source feature encoding sequence.

Based on the similarities corresponding to the respective target codes in the light source feature encoding sequence, a maximum similarity is selected as the similarity between the light source feature encoding sequence and the image feature encoding sequence.

Optionally, the target detection model is a trained YOLOv8 model and further includes the following.

An initial YOLOv8 model is trained based on a target loss function, and the trained YOLOv8 model is obtained.

The intersection-over-union ratio adopted by a bounding box regression loss of the target loss function is an intersection-over-union ratio between widths of box1 and box2 on the width coordinate axis, box1 is a real rectangular box of a sample, and box2 is a rectangular box predicted by a model for the sample.

In the second aspect, the disclosure further provides an LED light source recognition device based on deep learning, which includes the following.

A sample collecting module is used to obtain a spline frame through a CMOS camera in an LED lighting environment, in which the spline frame is an image having dark stripes.

A target detection module is used to input the spline frame to a target detection model to obtain a dark stripe detection result output by the target detection model, the dark stripe detection result includes multiple rectangular boxes and a predicted classification corresponding to each rectangular box, and the rectangular boxes are configured to mark dark stripe located areas or non-dark stripe located areas.

A preprocessing module is used to preprocess the multiple rectangular boxes to obtain multiple preprocessed rectangular boxes, and the respective preprocessed rectangular boxes do not overlap with or separate from each other.

An encoding module is used to determine the image feature encoding sequence of the spline frame based on the predicted classification corresponding to each preprocessed rectangular box.

A comparison module is used to compare the image feature encoding sequence with the light source feature encoding sequence corresponding to each LED light source to determine a light source feature encoding sequence that best matches the spline frame, and the light source feature encoding sequence is used to mark the LED light source.

Each LED light source in the LED lighting environment performs lighting based on a switching frequency $f_i$ and a duty cycle, i represents a given number of the LED light source, different LED light sources use different switching frequencies, different LED light sources use different duty cycles, $f_i$<W/S, S represents the shutter duration of the CMOS camera, the CMOS camera collects the image in a column-by-column scanning manner, W represents the width of the image collected by the CMOS camera, and the light source feature encoding sequence corresponding to the LED light source is determined based on the shutter duration, the image width, and the switching frequency and the duty cycle used by the LED light source.

In the third aspect, the disclosure provides an electronic apparatus, which includes at least one storage configured to store a program and at least one processor configured to execute the program stored in the storage. When the program stored in the storage is executed, the processor is used to execute the method described in the first aspect or any possible implementation of the first aspect.

In the fourth aspect, the disclosure provides a computer-readable storage medium, and the computer-readable storage medium stores a computer program. When the computer program is executed on a processor, the processor is caused to execute the method described in the first aspect or any possible implementation of the first aspect.

It may be understood that the beneficial effects of the second aspect to the fourth aspect may be found in the relevant description of the first aspect, so details will not be repeated here.

BRIEF DESCRIPTION OF THE DRAWINGS

In order to clearly illustrate the technical solutions in the disclosure or the related art, the following briefly introduces the drawings required for use in the description of the embodiments or the related art. Certainly, the drawings described below are some embodiments of the disclosure. For ordinary technicians in this field, other drawings may be obtained based on these drawings without any creative work.

FIG. 9 is a schematic diagram of a code in the light source feature encoding sequence provided by the disclosure aligning with a first code in the image feature encoding sequence.

DESCRIPTION OF THE EMBODIMENTS

In order to make the purpose, technical solutions, and advantages of the disclosure more comprehensible, the disclosure is further described in detail below together with the accompanying drawings and embodiments. It should be understood that the specific embodiments described herein are only used to explain the disclosure, and the embodiments are not used to limit the disclosure.

In the embodiments of the disclosure, words such as "exemplary" or "for example" are used to indicate examples, instances, or illustrations. Any embodiment or design described as "exemplary" or "for example" in the embodiments of the disclosure should not be construed as being preferred or advantageous over other embodiments or designs. Rather, the use of words such as "exemplary" or "for example" are intended to present the relevant concepts in a concrete fashion.

In the description of the embodiments of the disclosure, unless otherwise specified, the meaning of "multiple" refers to two or more than two. For example, multiple processing units refers to two or more processing units; and multiple elements refers to two or more elements.

Next, the technical solution provided in the embodiments of the disclosure is introduced.

Figure 1:
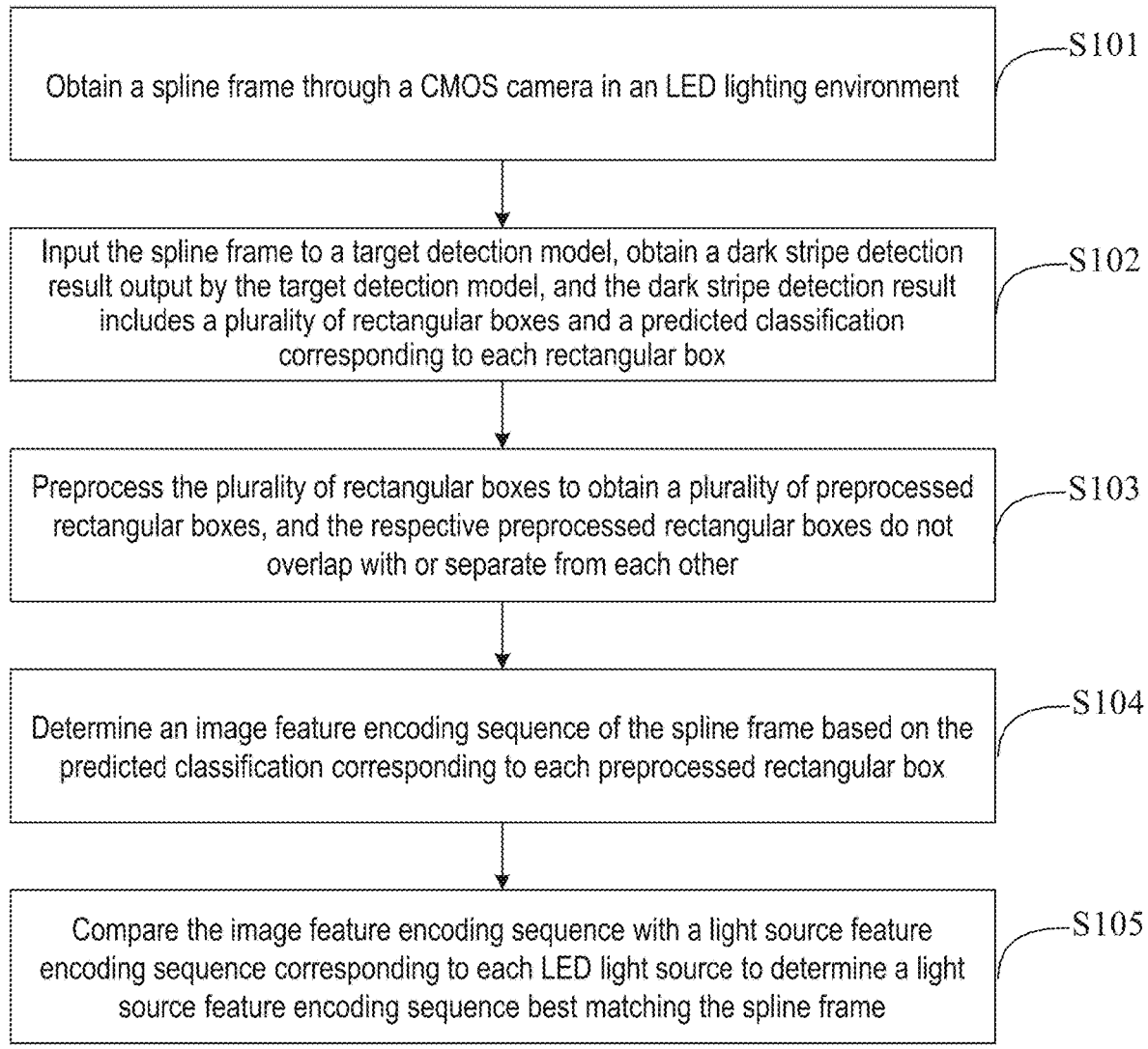
FIG. 1 is the first flow chart of a LED light source recognition method based on deep learning provided by the disclosure.

FIG. 1 is the first flow chart of a LED light source recognition method based on deep learning provided by the disclosure. As shown in FIG. 1, the executor of the method may be an electronic apparatus, such as a mobile terminal. The method includes step S101 to step S105 as follows.

Step S101. In an LED lighting environment, a spline frame is obtained through a CMOS camera, in which the spline frame is an image having dark stripes.

Specifically, each LED light source in the LED lighting environment performs lighting based on a switching frequency $f_i$ and a duty cycle, i represents a given number of the LED light source, different LED light sources use different switching frequencies, different LED light sources use different duty cycles, $f_i<W/S$, S represents the shutter duration of the CMOS camera, the CMOS camera collects the image in a column-by-column scanning manner, and W represents the width of the image collected by the CMOS camera.

Figure 2:
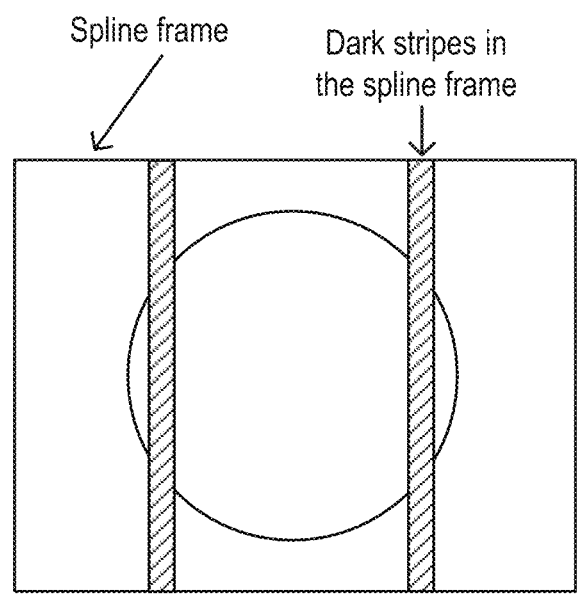
FIG. 2 is a schematic diagram of a spline frame provided by the disclosure.

It should be understood that, the frequency of the LED light $L_i$ is set as $f_i<Width/S$, and the limiting condition is to utilize the rolling shutter effect of the CMOS camera. When the CMOS camera senses light layer by layer, since $L_i$ is in an off state for part of a switching cycle, the CMOS camera does not sense light, and the image collected has black stripes. FIG. 2 is a schematic diagram of the spline frame provided by the disclosure. Since the indoor environment lighting is generally not from a single light source, the CMOS camera also senses light from other light sources. As shown in FIG. 2, the image collected has dark stripes.

Step S102. The spline frame is input to a target detection model, a dark stripe detection result output by the target detection model is obtained, the dark stripe detection result includes multiple rectangular boxes and a predicted classification corresponding to each rectangular box, and the rectangular boxes are configured to mark dark stripe located areas or non-dark stripe located areas.

Specifically, the target detection model may be used to detect dark stripes in the spline frame and output the dark stripe detection result, and the predicted classification corresponding to the rectangular box is a dark stripe class or a non-dark stripe class.

Optionally, the target detection model may be a YOLOv8 model, and the spline frame may be input to the YOLOv8 model to obtain the dark stripe detection result output by the YOLOv8 model.

Step S103. The multiple rectangular boxes are preprocessed to obtain multiple preprocessed rectangular boxes, and the respective preprocessed rectangular boxes do not overlap with or separate from each other.

Step S104. Based on the predicted classification corresponding to each preprocessed rectangular box, an image feature encoding sequence of the spline frame is determined.

Step S105. The image feature encoding sequence is compared with a light source feature encoding sequence corresponding to each LED light source to determine the light source feature encoding sequence that best matches the spline frame.

Specifically, each LED light source in the LED lighting environment performs lighting based on the switching frequency $f_i$ and the duty cycle. The CMOS camera uses the column-by-column scanning method to collect the images. By setting the appropriate switching frequency $f_i$ ($f_i<W/S$), spline frames having dark stripes may be collected under this LED lighting environment. The light source feature encoding sequence corresponding to the LED light source is determined based on the shutter duration, the image width, and the switching frequency and the duty cycle used by the LED light source. Since different LED light sources use different switching frequencies, different LED light sources use different duty cycles, thereby it is ensured that different LED light sources correspond to different light source feature encoding sequences, and the light source feature encoding sequence may uniquely mark the LED light source. After the spline frame is collected, the dark stripes in the spline frame may be detected by the target detection model to obtain the dark stripe detection result, and then each rectangular box in the dark stripe detection result may be preprocessed and the image feature encoding sequence of the spline frame is determined, then, the image feature encoding sequence may be compared with the light source feature encoding sequence corresponding to each LED light source to determine the light source feature encoding sequence that best matches the spline frame. Furthermore, it may be determined that the current position of the CMOS camera is near the LED light source marked by the best matching light source feature encoding sequence, so that LED lights may be efficiently used for indoor positioning, and assisted with other positioning technologies, precise positioning of the mobile terminal can be realized.

Figure 3:
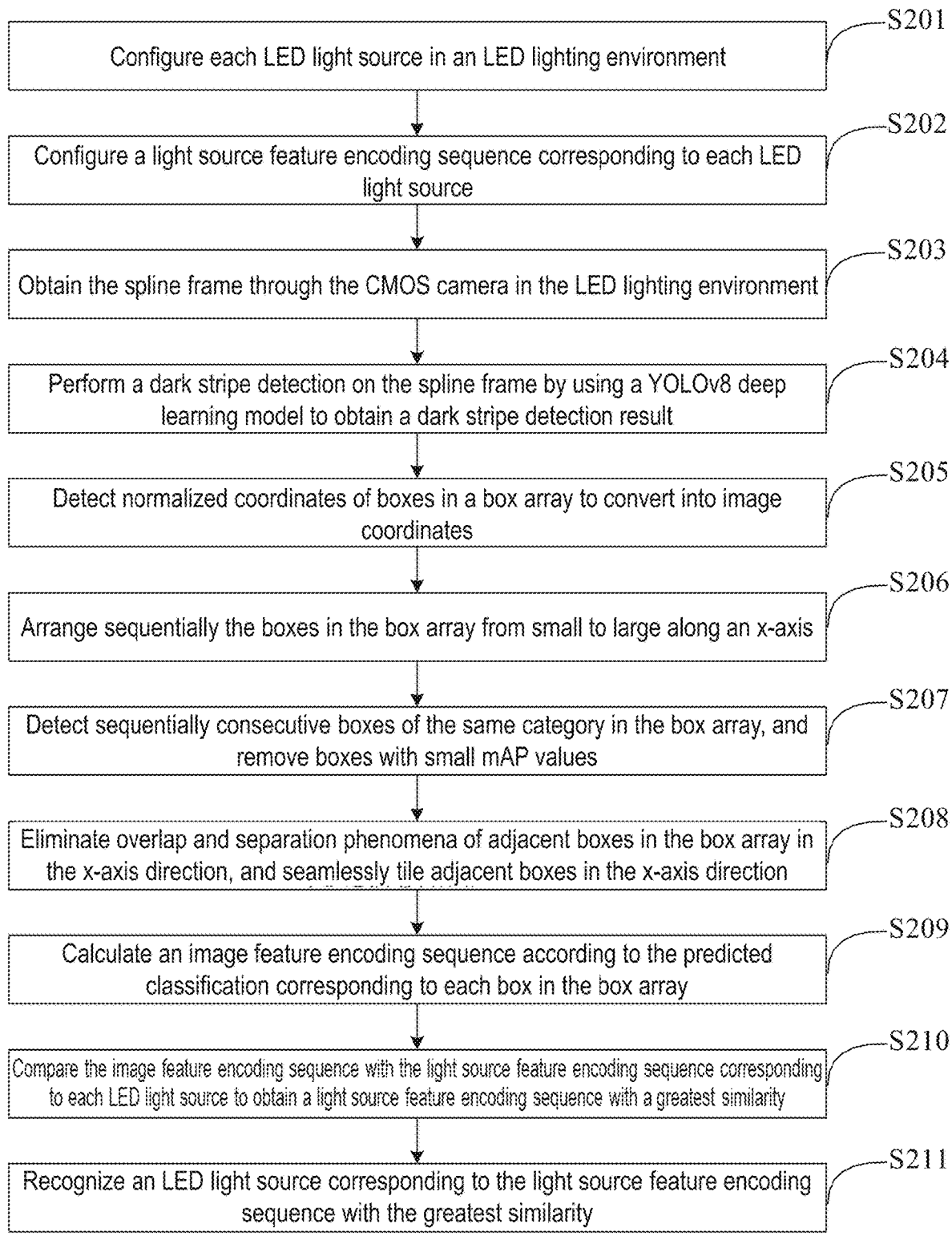
FIG. 3 is the second flow chart of the LED light source recognition method based on deep learning provided by the disclosure.

FIG. 3 is the second flow chart of the LED light source recognition method based on deep learning provided by the disclosure. As shown in FIG. 3, the LED light source recognition method based on deep learning provided by the disclosure includes step S201 to step S211 as follows.

Step S201. Each LED light source is configured in the LED lighting environment.

Specifically, the LED light source $L_i$ is controlled by programming on a single chip microcomputer ($0<i<N+1$, and N is the quantity of LED lights), so that $L_i$ realizes automatic switching using a lighting frequency $f_i$ and a duty cycle $\beta_i$ as feature parameters, in which the duty cycle refers to a ratio of an on-state time to an off-state time in one switching cycle. Assuming that the shutter duration of the CMOS camera is S, the image width is Width, and the frequency $f_i$ should satisfy the condition $f_i<Width/S$. This limiting condition is to utilize the rolling shutter effect of the CMOS camera so that the CMOS camera of the mobile terminal may obtain images with dark stripes in indoor environments. The lighting frequency and the duty cycle have to satisfy $f_i \neq f_j$ and $\beta_i \neq \beta_j$ ($i \neq j$, $0<i<N+1$, and $0<j<N+1$). This limiting condition is to enable the CMOS camera to encode and sense different light source feature encoding sequences for different LED light sources. The values of $f_i$ and $\beta_i$ are based on the premise that there is no flicker that may be perceived by the naked eye in a normal lighting environment.

Step S202. The light source feature encoding sequence corresponding to each LED light source is configured. The light source feature encoding sequence corresponding to the LED light source is determined based on the shutter duration, the image width, and the switching frequency and the duty cycle used by the LED light source.

Specifically, a light source feature encoding sequence lSequence$_i$ is generated according to the lighting frequency $f_i$ and the duty cycle $\beta_i$ of the LED light source $L_i$. lSequence$_i$ comprises $$\left\lfloor \frac{\text{Width}}{f_i \times S} \times \frac{\beta_i}{\beta_i + 1} \right\rfloor$$

consecutive 0s and $$\left\lceil \frac{\text{Width}}{f_i \times S} \times \frac{1}{\beta_i + 1} \right\rceil$$

consecutive 1s.

It may be understood that the lighting features (the lighting frequency $f_i$ and the duty cycle $\beta_i$) of the LED light source $L_i$ are reflected in the image collected by the CMOS camera (the shutter duration is S, and the image width is Width), and the features are expressed as a pixel width occupied by the dark stripe area and a pixel width occupied by the non-dark stripe area in a switching cycle. The pixel width occupied by the dark stripe area may be characterized by $$\left\lceil \frac{\text{Width}}{f_i \times S} \times \frac{1}{\beta_i + 1} \right\rceil$$

consecutive 1s, and the pixel width occupied by the non-dark stripe area may be characterized by $$\left\lfloor \frac{\text{Width}}{f_i \times S} \times \frac{\beta_i}{\beta_i + 1} \right\rfloor$$

consecutive 0s.

In the context, $$\left\lceil \frac{\text{Width}}{f_i \times S} \times \frac{1}{\beta_i + 1} \right\rceil$$

refers to the smallest integer larger than the equation $$\frac{\text{Width}}{f_i \times S} \times \frac{1}{\beta_i + 1},$$

and $$\left\lfloor \frac{\text{Width}}{f_i \times S} \times \frac{\beta_i}{\beta_i + 1} \right\rfloor$$

refers to the largest integer less than the equation $$\frac{\text{Width}}{f_i \times S} \times \frac{\beta_i}{\beta_i + 1}.$$

Figure 4:
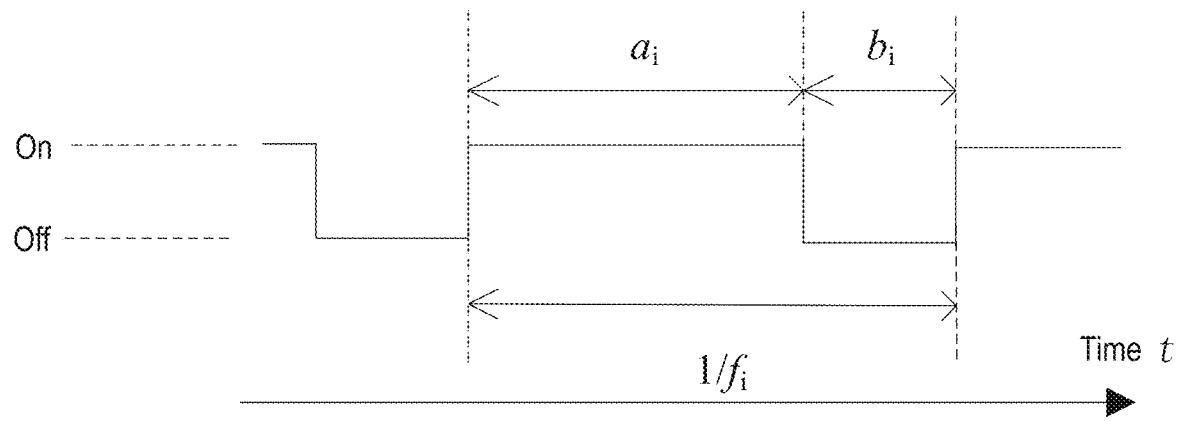
FIG. 4 is a schematic diagram of a light source feature encoding sequence corresponding to an LED light source provided by the disclosure.

FIG. 4 is a schematic diagram of the light source feature encoding sequence corresponding to the LED light source provided by the disclosure. As shown in FIG. 4, for a certain LED light source, the lighting frequency is $f_i$ and the duty cycle is $\beta_i = a_i/b_i$. It may be determined by $$\left\lfloor \frac{\text{Width}}{f_i \times S} \times \frac{\beta_i}{\beta_i + 1} \right\rfloor$$

that the pixel width occupied by the non-dark stripe area in a switching cycle is represented by sixteen 0s, it may be determined by $$\left\lceil \frac{\text{Width}}{f_i \times S} \times \frac{1}{\beta_i + 1} \right\rceil$$

that the pixel width occupied by the dark stripe area in a switching cycle is represented by seven 1s, that is, the light source feature encoding sequence corresponding to the LED light source is "00000000000000001111111".

Step S203. In the LED lighting environment, the spline frame is obtained by using the CMOS camera.

The CMOS camera of a mobile terminal App takes pictures in any direction in indoor lighting environments within the shutter time S to obtain a spline frame image with a width of Width and having dark stripes.

Step S204. A dark stripe detection is performed on the spline frame by using a YOLOv8 deep learning model to obtain a dark stripe detection result. The dark stripe detection result includes a box array of n rectangular boxes, and each box has a corresponding predicted classification. The box array refers to the box array of rectangular boxes in the output result of the YOLOv8 detection algorithm.

Figure 5:
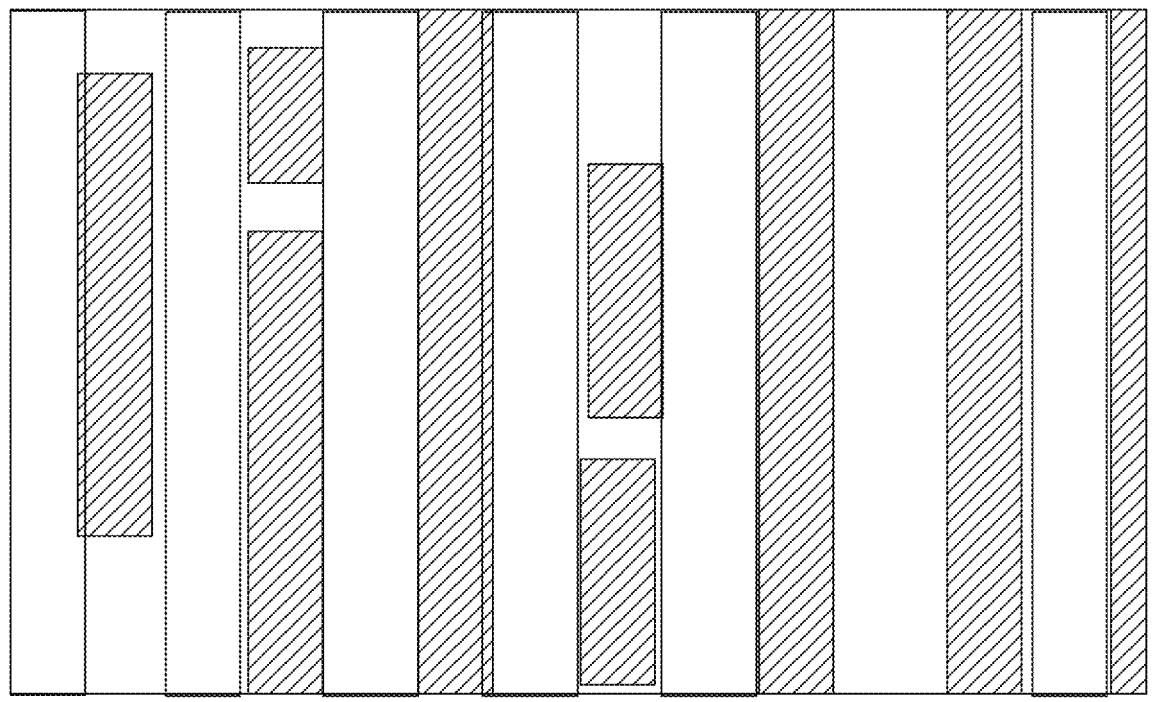
FIG. 5 is a schematic diagram of a dark stripe detection result output by a target detection model provided by the disclosure.

FIG. 5 is a schematic diagram of the dark stripe detection result output by the target detection model provided by the disclosure. As shown in FIG. 5, FIG. 5 shows the dark stripe detection result output by the YOLOv8 model. In the result, unfilled boxes are used to mark the non-dark stripe located areas, and filled boxes are used to mark the dark stripe located areas.

Specifically, the target detection model is a trained YOLOv8 model. An initial YOLOv8 model may be trained based on a target loss function to obtain the trained YOLOv8 model. The intersection-over-union ratio used by a bounding box regression loss of the target loss function is the intersection-over-union ratio between the widths of box1 and box2 on the width coordinate axis, box1 is a real rectangular box of the sample, and box2 is a rectangular box predicted by the model for the sample.

The target loss function Loss of the model is formed by classification loss ($L_{VFL}$) and the bounding box regression loss. The bounding box regression loss includes $L_{DFL}$ and $L_{CIoU}$, VFL represents vairfocal loss, and DFL represents distribution focal loss, that is, Loss=$L_{VFL}$+$L_{DFL}$+$L_{CIoU}$. In the formula, the following equations are satisfied.

$$L_{VFL} = -\frac{1}{N} \sum_{i=1}^{N} [q_i \times \log(p_i) + (1 - q_i) \times \log(1 - p_i)]$$

In the above equation, N represents the quantity of samples, $q_i$ represents a binary classification label of the ith sample (for example, the dark stripe class is 1, and the non-dark stripe class is 0), $p_i$ represents the probability that the model predicts the ith sample as a positive class (for example, the probability of predicting as a dark stripe class).

$$L_{DFL}(S_i, S_{i+1}) = -((y_{i+1} - y) \times \log(S_i) + (y - y_i) \times \log(S_{i+1}))$$

In the above equation, y represents a target position label, $y_i$ and $y_{i+1}$ represent two predicted positions closest to the target position label y with one position on the left and one position on the right, $S_i$ (may be obtained by performing calculation on $y_i$ through the sigmoid function) represents the probability corresponding to $y_i$, $S_{i+1}$ (may be obtained by performing calculation on $y_{i+1}$ through the sigmoid function) represents the probability corresponding to $y_{i+1}$; the role of DFL is to optimize the probabilities of the two positions, one position on the left and one position on the right, closest to the label y in the form of cross entropy, so that the network may focus on the distribution of the neighboring area of the target position more quickly.

$$L_{CIoU} = 1 - IoU + \frac{\rho^2(b, b^{gt})}{c^2} + \alpha \times v$$

In the above equation, IoU represents the intersection-over-union ratio between the widths of the real rectangular box box1 of the sample and the rectangular box box2 predicted by the model for the sample on the width coordinate axis (the intersection-over-union ratio between the widths of box1 and box2 is used instead of the intersection-over-union ratio between the areas of box1 and box2), $b^{gt}$ and b represent the center point of box1 and the center point of box2 respectively, ρ represents the Euclidean distance between box1 and box2, c represents the diagonal distance of the closed area between box1 and box2, v is used to characterize the consistency of the relative proportions between box1 and box2, and α is a weight coefficient.

Figure 6:
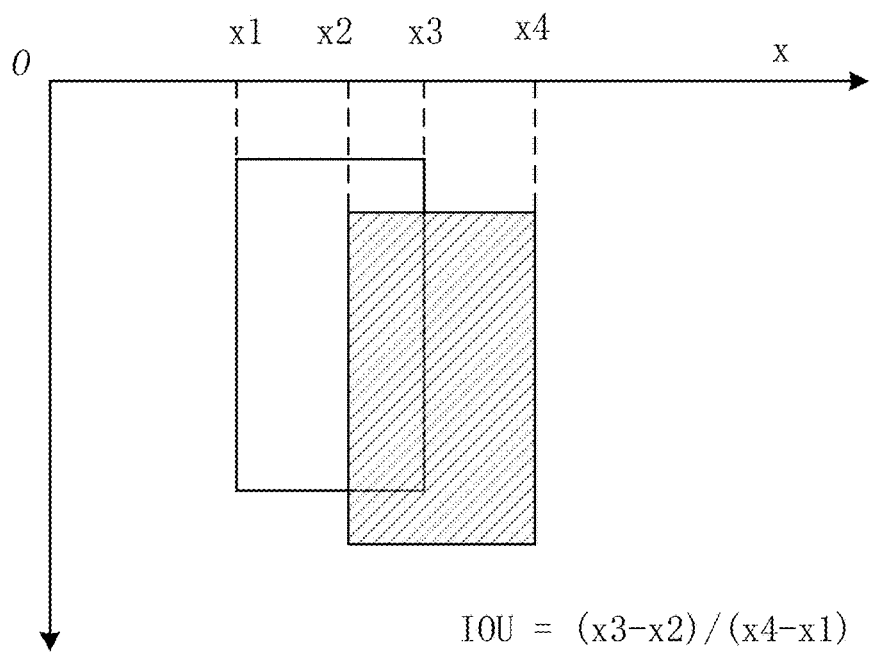
FIG. 6 is a schematic diagram of the width intersection-over-combination ratio provided by the disclosure.

FIG. 6 is a schematic diagram of the width intersection-over-union ratio provided by the disclosure. As shown in FIG. 6, the intersection-over-union ratio between widths of the two boxes $$IoU = \frac{(x3 - x2)}{(x4 - x1)}.$$

It may be understood that the intersection-over-union ratio used in the bounding box regression loss of the YOLOv8 model in the related art is the intersection-over-union ratio between the areas of box1 and box2 (the intersection area of the two boxes divided by the union area of the two boxes). The lighting features (the lighting frequency $f_i$ and the duty cycle $\beta_i$) of the LED light source $L_i$ of the disclosure are reflected in the image collected by the CMOS camera (the shutter duration is S, and the image width is Width), and the features are expressed as the pixel width occupied by the dark stripe area and the pixel width occupied by the non-dark stripe area in a switching cycle. Accordingly, during the training process, the training is focused on improving the precision of the rectangular box predicted by the target detection model on the width coordinate axis. Therefore, the intersection-over-union ratio used in the bounding box regression loss of the YOLOv8 model in the disclosure is the width intersection-over-union ratio (on the width coordinate axis, the intersection length of the widths of the two boxes divided by the union length of the widths of the two boxes) between box1 and box2 on the width coordinate axis, so that the trained YOLOv8 model may more accurately detect the dark stripe area or the non-dark stripe area in the direction of the width coordinate axis.

Spline frame sample data may be labeled by using a labeling tool (such as Labelimg) to generate a txt file format. Category labels of the box are divided into two types (the dark stripe area or the non-dark stripe area). The labeling tool is used to mark the dark stripe area as 1, and to mark a rectangular area between two adjacent dark stripes (the non-dark stripe area) as 0. The samples are trained using the YOLOv8 model. Detection is performed on the spline frame by using the trained model to obtain a box array of n rectangular boxes. The output manner of box is box.xyxy (representing coordinates of two points at the diagonal corners of the box), and the coordinate values obtained are normalized values.

It should be understood that for the box array output by YOLOv8, the coordinate values of each box are normalized values, and there may be overlap or separation phenomenon between different boxes. Therefore, the box array may be preprocessed through subsequent steps S205, S206, S207, and S208.

Step S205. The normalized coordinates of the boxes in the box array are detected to convert into image coordinates.

Step S206. Along the x-axis (the image width coordinate axis), the boxes in the box array are sequentially arranged from small to large according to values of (box.x1+box.x2).

Step S207. Consecutive boxes of the same category in the box array are detected sequentially, and boxes with small mAP (mean average precision) values are removed.

Figure 7:
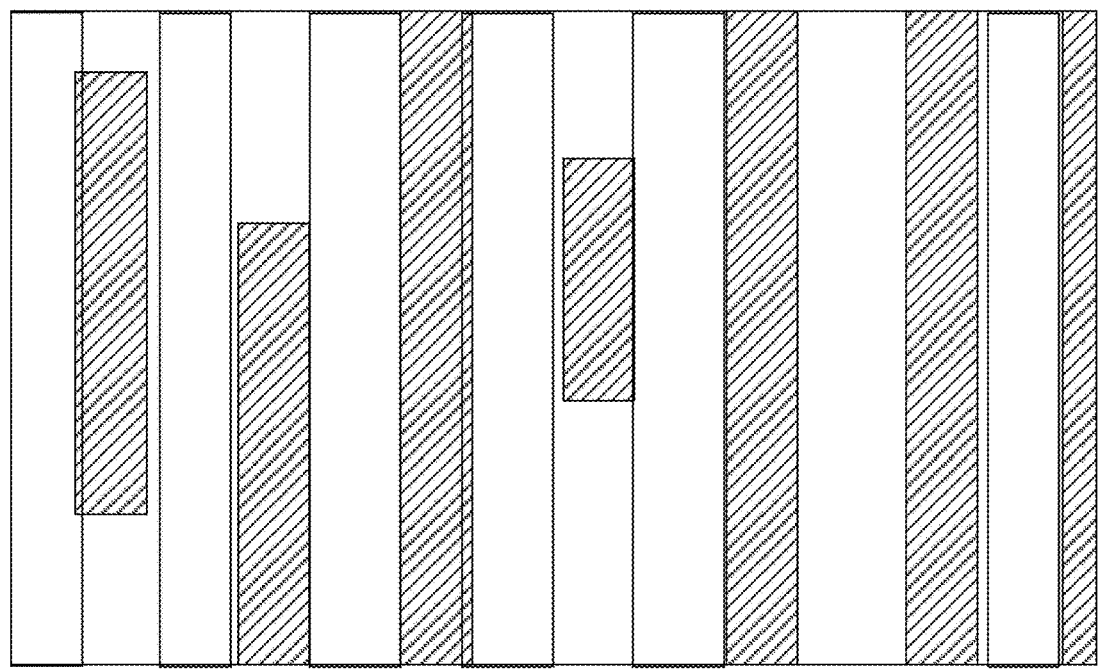
FIG. 7 is a schematic diagram of a box array after removing boxes with small mean average precision provided by the disclosure.

FIG. 7 is a schematic diagram of the box array after removing boxes with small mean average precision provided by the disclosure. A rectangular box sequence after the removal process is shown in FIG. 7.

Specifically, based on the rectangular box sequence (that is, the sequentially arranged box array), rectangular box removal process is performed, and a rectangular box sequence after the removal process is obtained. In the rectangular box removal process, for each target adjacent group, a rectangular box with a small mean average precision mAP in each target adjacent group is removed. The target adjacent group includes two adjacent rectangular boxes and the two rectangular boxes have the same predicted classification.

Step S208. The overlap and separation phenomena of adjacent boxes in the box array in the x-axis (that is, the width coordinate axis) direction are eliminated, and adjacent boxes are seamlessly tiled in the x-axis direction.

Figure 8:
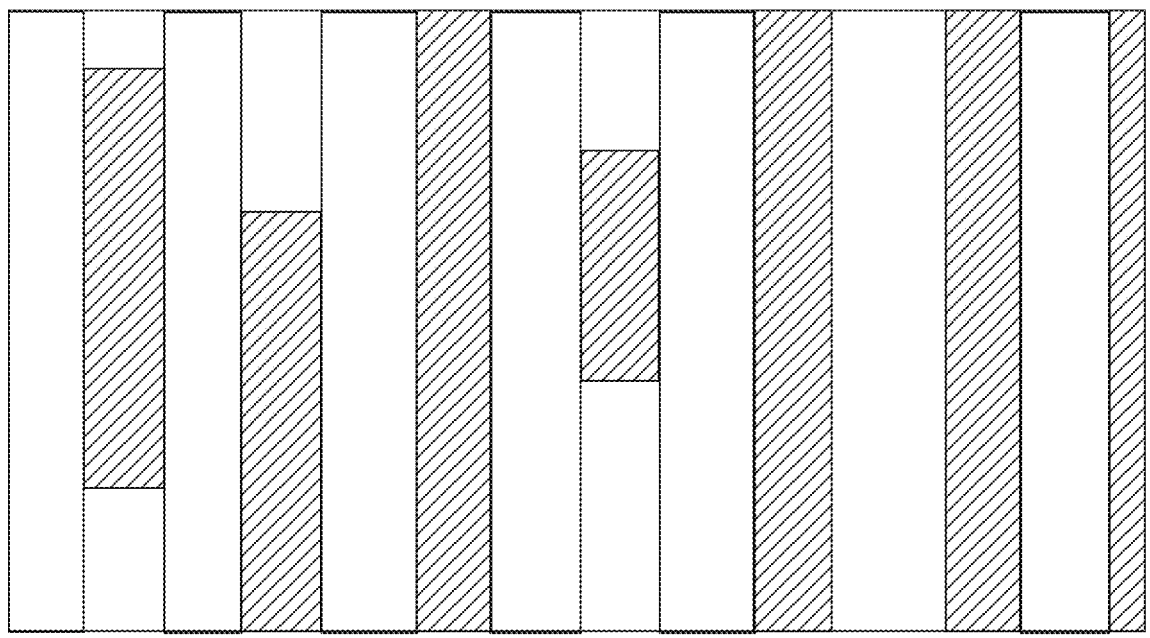
FIG. 8 is a schematic diagram of the box array after the overlapping and separation areas are eliminated provided by the disclosure.

FIG. 8 is a schematic diagram of the box array after the overlapping and separation areas are eliminated provided by the disclosure, and the box array after the adjacent boxes are seamlessly tiled in the x-axis direction is shown in FIG. 8.

Specifically, for any two adjacent rectangular boxes in the rectangular box sequence (the box array) after the removal process, when the two rectangular boxes overlap on the x-axis, the rear boundary of the former rectangular box of the two rectangular boxes is moved forward along mAPbefore the x-axis, and a distance moved forward is $$W_{overlap} \times \frac{mAPbefore}{mAPbefore + mAPafter}.$$

The front boundary of the latter rectangular box of the two rectangular boxes is moved backward along the x-axis, and a distance moved backward is $$W_{overlap} \times \frac{mAPafter}{mAPbefore + mAPafter}.$$

In the formula, $W_{overlap}$ represents the width of the overlapping area between two rectangular boxes, mAPbefore represents the mean average precision of the former rectangular box, and mAPafter represents the mean average precision of the latter rectangular box.

Specifically, for any two adjacent rectangular boxes in the rectangular box sequence after the removal process, when the two rectangular boxes are separated on the x-axis, the rear boundary of the former rectangular box of the two rectangular boxes is moved backward along the x-axis, and a distance moved backward is $$W_{Separation} \times \frac{mAPbefore}{mAPbefore + mAPafter}.$$

The front boundary of the latter rectangular box of the two rectangular boxes is moved forward along the x-axis, and a distance moved forward is $$W_{Separation} \times \frac{mAPafter}{mAPbefore + mAPafter}.$$

In the formula, $W_{Separation}$ represents the width of the separation area between two rectangular boxes, mAPbefore represents the mean average precision of the former rectangular box, and mAPafter represents the mean average precision of the latter rectangular box.

Step S209. According to the predicted classification corresponding to each box in the box array, an image feature encoding sequence pSequence is calculated.

Specifically, along the x-axis, the width of each preprocessed rectangular box is adjusted to obtain multiple width-adjusted rectangular boxes, the width adjustment is used to adjust the front and rear boundaries of the preprocessed rectangular box, box.

$$x_{new} = \frac{box.x_{old} \times W}{length},$$

box.$x_{old}$ is coordinates of the target boundary before the width of the preprocessed rectangular box is adjusted, box.$x_{new}$ is coordinates of the target boundary after the width of the preprocessed rectangular box is adjusted, the target boundary is the front boundary or the rear boundary, W is the image width, and length represents coordinate values of the rear boundary of the last preprocessed rectangular box.

Based on the width and predicted classification corresponding to each width-adjusted rectangular box, a feature encoding sequence corresponding to each width-adjusted rectangular box is determined.

The feature encoding sequences corresponding to the respective width-adjusted rectangular boxes are integrated to determine the image feature encoding sequence of the spline frame.

It may be understood that the light source feature encoding sequence corresponding to the LED light source is determined based on the shutter duration, the image width, and the switching frequency and the duty cycle used by the LED light source. After adjusting the coordinates of the boxes in the previous stage, the sum of the widths of all boxes may not be completely consistent with the image width. Here, after adjusting the width of the boxes through box.

$$x_{new} = \frac{box.x_{old} \times W}{length},$$

the sum of the widths of all boxes may be made consistent with the image width, thereby it is ensured that the image feature encoding sequence and the light source feature encoding sequence corresponding to each LED light source are compared under the same image width.

For example, for a width-adjusted rectangular box, when the category of the box is 1, [box.x2−box.x1] consecutive is are generated as the feature encoding sequence corresponding to the box; when the category of the box is 0, [box.x2−box.x1] consecutive 0s are generated as the feature encoding sequence corresponding to the box. Finally, all the consecutive 1s or consecutive 0s are concatenated (that is, the feature encoding sequences corresponding to the respective width-adjusted rectangular boxes are integrated), and the image feature encoding sequence is formed.

Step S210. The image feature encoding sequence is compared with the light source feature encoding sequence lSequence$_i$ corresponding to each LED light source to obtain a light source feature encoding sequence iSequence$_{max}$ with the greatest similarity (best match).

Specifically, for the light source feature encoding sequence lSequence$_i$ corresponding to each LED light source, a similarity analysis is performed to determine the similarity between the light source feature encoding sequence lSequence$_i$ corresponding to each LED light source and the image feature encoding sequence pSequence.

Based on the similarity between the light source feature encoding sequence lSequence$_i$ corresponding to each LED light source and the image feature encoding sequence pSequence, the light source feature encoding sequence lSequence$_{max}$ that best matches the spline frame is determined.

Specifically, the similarity analysis includes as follows. For each target code in the light source feature encoding sequence lSequence$_i$, the target code is aligned with the first code of the image feature encoding sequence pSequence, the light source feature encoding sequence lSequence$_i$ is used as content of a sliding window, at each window position, each code in the sliding window is compared with the code at the corresponding position in the image feature encoding sequence pSequence to see if the codes are equal, the total quantity of times of the codes being equal is calculated and the total quantity is used as a similarity corresponding to the target code, the sliding window is used to slide from the current window position to the next window position according to the target step size, and the target step size is equal to the length of the light source feature encoding sequence lSequence$_i$.

Based on the similarities corresponding to each target code in the light source feature encoding sequence lSequence$_i$, the maximum similarity is selected as the similarity between the light source feature encoding sequence lSequence$_i$ and the image feature encoding sequence pSequence.

FIG. 9 is a schematic diagram of the code in the light source feature encoding sequence provided by the disclosure aligning with the first code in the image feature encoding sequence. As shown in FIG. 9, the first code of the image feature encoding sequence may be aligned with a first code code1 (as the target code) in the light source feature encoding sequence, at each window position, each code in the sliding window is compared with the code at the corresponding position in the image feature encoding sequence pSequence to see if the codes are equal, the total quantity of times of the codes being equal is calculated and the total quantity is used as the similarity corresponding to code1; the first code of the image feature encoding sequence may be aligned with a second code code2 (as the target code) in the light source feature encoding sequence, at each window position, each code in the sliding window is compared with the code at the corresponding position in the image feature encoding sequence pSequence to see if the codes are equal, the total quantity of times of the codes being equal is calculated and the total quantity is used as the similarity corresponding to code2; the first code of the image feature encoding sequence may be aligned with a third code code3 (as the target code) in the light source feature encoding sequence, at each window position, each code in the sliding window is compared with the code at the corresponding position in the image feature encoding sequence pSequence to see if the codes are equal, the total quantity of times of the codes being equal is calculated and the total quantity is used as the similarity corresponding to code3; by analogy, the similarity corresponding to each target code in the light source feature encoding sequence $lSequence_i$ may be determined.

Figure 10:
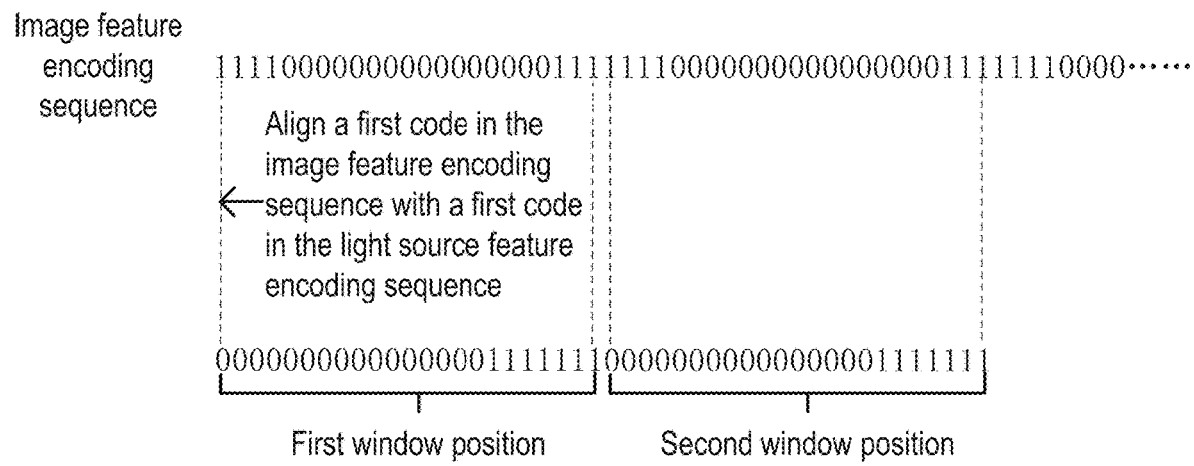
FIG. 10 is a schematic diagram of multiple window positions provided by the disclosure.

FIG. 10 is a schematic diagram of multiple window positions provided by the disclosure. As shown in FIG. 10, when the first code of the image feature encoding sequence is aligned with the first code code1 (as the target code) in the light source feature encoding sequence, the light source feature encoding sequence $lSequence_i$ is used as the content of the sliding window. The sliding window is used to slide from the current window position to the next window position according to the target step size. The target step size is equal to the length of the light source feature encoding sequence $lSequence_i$. At a first window position, each code in the sliding window is compared with the code at the corresponding position in the image feature encoding sequence pSequence to see if the codes are equal, the quantity of times of the codes being equal at the current window position is calculated as 15. After sliding one step according to the target step size, at a second window position, each code in the sliding window is compared with the code at the corresponding position in the image feature encoding sequence pSequence to see if the codes are equal, the quantity of times of the codes being equal at the current window position is calculated as 15. By analogy, the quantity of times the codes being equal may be calculated at each window position, and the total quantity may be determined by accumulation and used as the similarity corresponding to the target code.

Step S211. According to the corresponding relationship between the LED light source and the light source feature encoding sequence, the LED light source corresponding to $lSequence_{max}$ is recognized.

It may be understood that the disclosure utilizes the mobile terminal to recognize the LED light source, and only the lighting frequency $f_i$ and the duty cycle $\beta_i$ of each LED light source are required, the requirement has nothing to do with the deployment layout of the LED light sources, and no additional hardware design is required for the LED light sources. The recognition method only relies on the mobile terminal to use the CMOS camera to collect scene images of a fixed width. The mobile terminal only needs to have simple model calculation capabilities and does not require additional design or loading of special hardware modules. The recognition method provided by the disclosure does not require setting additional parameters during execution. The computational complexity and space complexity in step S204 depend on the YOLOv8 network structure, and the computational complexity and space complexity in step S205 are $O(|boxes|)$. The computational complexity and space complexity of the algorithm in step S206 are $O(|boxes|^2)$. The computational complexity and space complexity of the algorithm in step S207 to S209 are $O(|boxes|)$. Overall, the entire method process takes less than 20 ms to perform a detection and recognition on the mobile terminal, thereby the real-time performance is good. Therefore, the method proposed in the disclosure is suitable for positioning and navigation in any complex indoor scene (for example, large indoor scenes such as parking lots, shopping malls, exhibition halls, and museums) using LED lights as lighting sources, and the disclosure has the advantages of real-time, low power consumption, and low complexity.

An LED light source recognition device based on deep learning provided by the disclosure is described below. The LED light source recognition device based on deep learning described below and the LED light source recognition method based on deep learning described above may be referred to each other.

Figure 11:
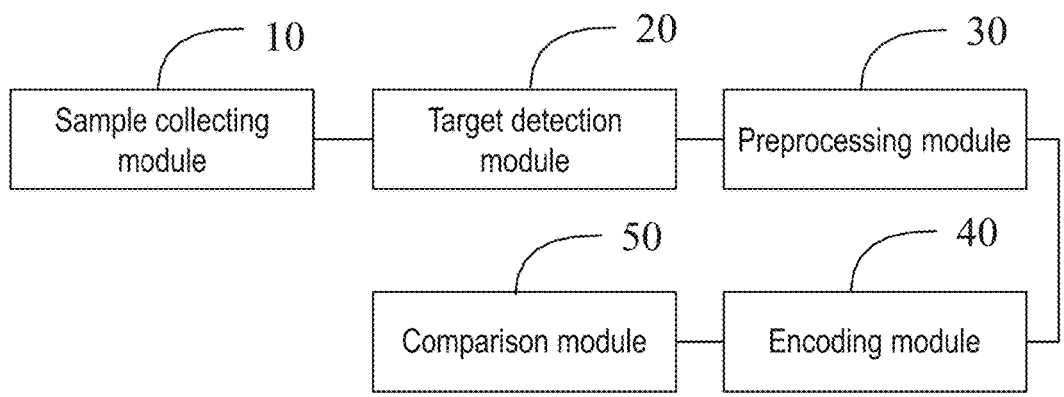
FIG. 11 is a schematic diagram of a structure of an LED light source recognition device based on deep learning provided by the disclosure.

FIG. 11 is a schematic diagram of a structure of an LED light source recognition device based on deep learning provided by the disclosure. As shown in FIG. 11, the device includes a sample collecting module 10, a target detection module 20, a preprocessing module 30, an encoding module 40, and a comparison module 50. A description of the components are as follows.

The sample collecting module 10 is used to obtain a spline frame through a CMOS camera in an LED lighting environment, in which the spline frame is an image having dark stripes.

The target detection module 20 is used to input the spline frame to a target detection model to obtain a dark stripe detection result output by the target detection model, the dark stripe detection result includes multiple rectangular boxes and a predicted classification corresponding to each rectangular box, and the rectangular boxes are configured to mark dark stripe located areas or non-dark stripe located areas.

The preprocessing module 30 is used to preprocess the multiple rectangular boxes to obtain multiple preprocessed rectangular boxes, and the respective preprocessed rectangular boxes do not overlap with or separate from each other.

The encoding module 40 is used to determine the image feature encoding sequence of the spline frame based on the predicted classification corresponding to each preprocessed rectangular box.

The comparison module 50 is used to compare the image feature encoding sequence with the light source feature encoding sequence corresponding to each LED light source to determine a light source feature encoding sequence that best matches the spline frame, and the light source feature encoding sequence is used to mark the LED light source.

Following the above, each LED light source in the LED lighting environment performs lighting based on the switching frequency $f_i$ and the duty cycle, i represents the given number of the LED light source, different LED light sources use different switching frequencies, different LED light sources use different duty cycles, $f_i < W/S$, S represents the shutter duration of the CMOS camera, the CMOS camera collects the image in a column-by-column scanning manner, and W represents the width of the image collected by the CMOS camera, and the light source feature encoding sequence corresponding to the LED light source is determined based on the shutter duration, the image width, and the switching frequency and the duty cycle used by the LED light source.

It should be understood that the device is used to execute the method in the above-mentioned embodiments. The implementation principle and technical effect of the corresponding program module in the device are similar to the description in the method, the working process of the device may be referred to the corresponding process in the method, so details will not be repeated here.

Based on the method in the embodiments, an electronic apparatus is provided according to an embodiment of the disclosure. The device may include at least one storage configured to store a program and at least one processor configured to execute the program stored in the storage. When the program stored in the storage is executed, the processor is used to execute the method described in the embodiments.

Based on the method in the embodiments, a computer-readable storage medium is provided according to an embodiment of the disclosure. The computer-readable storage medium stores a computer program, and when the computer program runs on a processor, the processor executes the method in the embodiments.

Based on the method in the embodiments, a computer program product is provided according to an embodiment of the disclosure. When the computer program product runs on a processor, the processor executes the method in the embodiments.

It should be understood that the processor in the embodiments of the disclosure may be a central processing unit (CPU), may also be other general-purpose processors, digital signal processors (DSP), application specific integrated circuit (ASIC), field programmable gate array (FPGA), or other programmable logic devices, transistor logic devices, hardware components or combinations thereof. A general purpose processor may be a microprocessor or any conventional processor.

The steps of the method in the embodiments of the disclosure may be implemented by hardware, or by a processor executing software commands. The software commands may comprise corresponding software modules, and the software modules may be stored in random access memory (RAM), flash memory, read-only memory (ROM), programmable ROM (PROM), erasable PROM (EPROM), electrically EPROM (EEPROM), register, hard disk, mobile hard disk, CD-ROM, or any other form of storage media known in the art. An exemplary storage medium is coupled to the processor such that the processor may read information from, and write information to, the storage medium. Certainly, the storage medium may also be an integral part of the processor. The processor and the storage medium may reside in an ASIC.

In the embodiments, all or part of the embodiments may be implemented by software, hardware, firmware, or any combination thereof. When implemented using software, all or part of the implementation may be in the form of a computer program product. The computer program product comprises one or more computer commands. When the computer program commands are loaded and executed on a computer, the process or function described in the embodiments of the disclosure is generated in whole or in part. The computer may be a general purpose computer, a special purpose computer, a computer network, or other programmable device. The computer commands may be stored in the computer-readable storage medium or transmitted via the computer-readable storage medium. The computer commands may be sent from a website, computer, server, or data center via a wired (for example, coaxial cable, optical fiber, digital subscriber line (DSL)) or wireless (for example, infrared, wireless, microwave) manner to another website, computer, server, or data center. The computer-readable storage medium may be any available medium that may be accessed by a computer or may be a data storage device such as a server or a data center including one or more available media. The available medium may be a magnetic medium (for example, a floppy disk, a hard disk, a magnetic tape), an optical medium (for example, a DVD), or a semiconductor medium (for example, a solid state disk (SSD)).

In general, the above technical solution conceived by the disclosure has beneficial effects as follows compared with the related art.

Each LED light source in the LED lighting environment performs lighting based on the switching frequency $f_i$ and the duty cycle. The CMOS camera uses the column-by-column scanning method to collect the images. By setting the appropriate switching frequency $f_i$ ($f_i$<W/S), spline frames having dark stripes may be collected under this LED lighting environment. The light source feature encoding sequence corresponding to the LED light source is determined based on the shutter duration, the image width, and the switching frequency and the duty cycle used by the LED light source. Since different LED light sources use different switching frequencies, different LED light sources use different duty cycles, thereby it is ensured that different LED light sources correspond to different light source feature encoding sequences, and the light source feature encoding sequence may uniquely mark the LED light source. After the spline frame is collected, the dark stripes in the spline frame may be detected by the target detection model to obtain the dark stripe detection result, and then each rectangular box in the dark stripe detection result may be preprocessed and the image feature encoding sequence of the spline frame is determined, then, the image feature encoding sequence may be compared with the light source feature encoding sequence corresponding to each LED light source to determine the light source feature encoding sequence that best matches the spline frame. Furthermore, it may be determined that the current position of the CMOS camera is near the LED light source marked by the best matching light source feature encoding sequence, so that LED lights may be efficiently used for indoor positioning, and assisted with other positioning technologies, precise positioning of the mobile terminal can be realized.

It should be understood that the various numerical numbers involved in the embodiments of the disclosure are only used for the convenience of description and are not used to limit the scope of the embodiments of the disclosure.

It is understood by persons skilled in the art that the above description is only preferred embodiments of the disclosure and the embodiments are not intended to limit the disclosure. Any modifications, equivalent substitutions, and improvements made within the spirit and principles of the disclosure should be included in the protection scope of the disclosure.

What is claimed is:

1. An LED light source recognition method based on deep learning, comprising:
   obtaining a spline frame through a CMOS camera in an LED lighting environment, wherein the spline frame is an image having dark stripes;

inputting the spline frame to a target detection model, obtaining a dark stripe detection result output by the target detection model, wherein the dark stripe detection result comprises multiple rectangular boxes and a predicted classification corresponding to each of the rectangular boxes, and the rectangular boxes are configured to mark dark stripe located areas or non-dark stripe located areas;

preprocessing the multiple rectangular boxes to obtain multiple preprocessed rectangular boxes, wherein the respective preprocessed rectangular boxes do not overlap with or separate from each other;

determining an image feature encoding sequence of the spline frame based on the predicted classification corresponding to each of the preprocessed rectangular boxes;

comparing the image feature encoding sequence with a light source feature encoding sequence corresponding to each LED light source to determine the light source feature encoding sequence best matching the spline frame, wherein the light source feature encoding sequence is configured to mark the LED light source;

wherein each of the LED light sources in the LED lighting environment performs lighting based on a switching frequency $f_i$ and a duty cycle, i represents a given number of the LED light source, the respective LED light sources use different switching frequencies, the respective LED light sources use different duty cycles, $f_i < W/S$, S represents a shutter duration of the CMOS camera, the CMOS camera collects the image in a column-by-column scanning manner, and W represents a width of the image collected by the CMOS camera; the light source feature encoding sequence corresponding to the LED light source is determined based on the shutter duration, the width of the image, and the switching frequency and the duty cycle adopted by the LED light source;

wherein the light source feature encoding sequence $lSequence_i$ is formed by $$\left\lfloor \frac{W}{f_i \times S} \times \frac{\beta_i}{\beta_i + 1} \right\rfloor$$

consecutive 0s and $$\left\lceil \frac{W}{f_i \times S} \times \frac{1}{\beta_i + 1} \right\rceil$$

consecutive 1s, $$\left\lceil \frac{W}{f_i \times S} \times \frac{1}{\beta_i + 1} \right\rceil$$

refers to a smallest integer larger than $$\frac{W}{f_i \times S} \times \frac{1}{\beta_i + 1}, \left\lfloor \frac{W}{f_i \times S} \times \frac{\beta_i}{\beta_i + 1} \right\rfloor$$

refers to a largest integer less than $$\frac{W}{f_i \times S} \times \frac{\beta_i}{\beta_i + 1},$$

and $\beta_i$ represents the duty cycle;

wherein preprocessing the multiple rectangular boxes to obtain the multiple preprocessed rectangular boxes comprises:

performing normalization processing on the multiple rectangular boxes to obtain multiple normalized rectangular boxes;

arranging sequentially the multiple normalized rectangular boxes in an ascending order along an image width coordinate axis to obtain a rectangular box sequence;

performing a rectangular box removal process is based on the rectangular box sequence to obtain a rectangular box sequence after the removal process, wherein the rectangular box removal process is configured to remove a rectangular box with a small mean average precision in a target adjacent group for each of the target adjacent groups, and the target adjacent group comprises two adjacent rectangular boxes and the two rectangular boxes have same predicted classification;

performing an elimination process on overlapping areas or separation areas based on the rectangular box sequence after the removal process to obtain the multiple preprocessed rectangular boxes;

wherein performing the elimination process on the overlapping areas or the separation areas based on the rectangular box sequence after the removal process to obtain the multiple preprocessed rectangular boxes comprises:

for any two adjacent rectangular boxes in the rectangular box sequence after the removal process, in response to the two rectangular boxes being overlapped on the image width coordinate axis, moving forward a rear boundary of a former rectangular box in the two rectangular boxes along the image width coordinate axis, wherein a distance moved forward is $$W_{overlap} \times \frac{mAPbefore}{mAPbefore + mAPafter};$$

moving backward a front border of a latter rectangular box in the two rectangular boxes along the image width coordinate axis, wherein a distance moved backward is $$W_{overlap} \times \frac{mAPafter}{mAPbefore + mAPafter};$$

wherein $W_{overlap}$ represents a width of an overlapping area between the two rectangular boxes, mAPbefore represents a mean average precision of the former rectangular box, and mAPafter represents a mean average precision of the latter rectangular box;

wherein performing the elimination process on the overlapping areas or the separation areas based on the rectangular box sequence after the removal process to obtain the multiple preprocessed rectangular boxes comprises:

for any two adjacent rectangular boxes in the rectangular box sequence after the removal process, in response to the two rectangular boxes being separated on the image width coordinate axis, moving backward a rear boundary of a former rectangular box in the two rectangular boxes along the image width coordinate axis, wherein a distance moved backward mAPbefore is $$W_{Separation} \times \frac{mAPbefore}{mAPbefore + mAPafter};$$

moving forward a front border of a latter rectangular box in the two rectangular boxes along the image width coordinate axis, wherein a distance moved forward is $$W_{separation} \times \frac{mAPafter}{mAPbefore + mAPafter};$$

wherein $W_{Separation}$ represents a width of a separation area between the two rectangular boxes, mAPbefore represents a mean average precision of the former rectangular box, and mAPafter represents a mean average precision of the latter rectangular box.

2. The LED light source recognition method based on deep learning according to claim 1, wherein determining the image feature encoding sequence of the spline frame based on the predicted classification corresponding to each of the preprocessed rectangular boxes comprises:

adjusting a width of each of the preprocessed rectangular boxes along the image width coordinate axis to obtain multiple width-adjusted rectangular boxes, wherein the width adjustment is configured to adjust front boundaries and rear boundaries of the preprocessed rectangular boxes, $$box.x_{new} = \frac{box.x_{old} \times W}{length},$$

$box.x_{old}$ is coordinates of a target boundary before the width of the preprocessed rectangular box is adjusted, $box.x_{new}$ is coordinates of a target boundary after the width of the preprocessed rectangular box is adjusted, the target boundary is the front boundary or the rear boundary, W is the image width, and length represents coordinate values of a rear boundary of a last preprocessed rectangular box;

determining a feature encoding sequence corresponding to each of the width-adjusted rectangular boxes based on the width and a predicted classification corresponding to each of the width-adjusted rectangular boxes; and integrating the feature encoding sequences corresponding to the respective width-adjusted rectangular boxes to determine the image feature encoding sequence of the spline frame.

3. The LED light source recognition method based on deep learning according to claim 2, wherein the target detection model is a trained YOLOv8 model, and further comprises:

training an initial YOLOv8 model based on a target loss function, and obtaining the trained YOLOv8 model;

wherein an intersection-over-union ratio adopted by a bounding box regression loss of the target loss function is an intersection-over-union ratio between widths of box1 and box2 on the width coordinate axis, box1 is a real rectangular box of a sample, and box2 is a rectangular box predicted by a model for the sample.

4. An electronic apparatus, comprising:
at least one storage configured to store a program; and
at least one processor configured to execute the program stored in the storage, wherein in response to the program stored in the storage being executed, the processor is configured to execute the method according to claim 3.

5. A non-transitory computer-readable storage medium, wherein the computer-readable storage medium stores a computer program, in response to the computer program running on a processor, the processor is caused to execute the method according to claim 3.

6. An electronic apparatus, comprising:
at least one storage configured to store a program; and
at least one processor configured to execute the program stored in the storage, wherein in response to the program stored in the storage being executed, the processor is configured to execute the method according to claim 2.

7. A non-transitory computer-readable storage medium, wherein the computer-readable storage medium stores a computer program, in response to the computer program running on a processor, the processor is caused to execute the method according to claim 2.

8. The LED light source recognition method based on deep learning according to claim 1, wherein comparing the image feature encoding sequence with the light source feature encoding sequence corresponding to each of the LED light sources to determine the light source feature encoding sequence best matching the spline frame comprises:

a similarity analysis is performed for the light source feature encoding sequence corresponding to each of the LED light sources to determine a similarity between the light source feature encoding sequence corresponding to each of the LED light sources and the image feature encoding sequence;

determining the light source feature encoding sequence best matching the spline frame based on the similarity between the light source feature encoding sequence corresponding to each of the LED light sources and the image feature encoding sequence;

wherein the similarity analysis comprises:

aligning a target code with a first code of the image feature encoding sequence for each of the target codes in the light source feature encoding sequence, using the light source feature encoding sequence as content of a sliding window, at each window position, comparing each code in the sliding window with a code at a corresponding position in the image feature encoding sequence to see whether the codes are equal, calculating a total quantity of times of the codes being equal and using the total quantity as a similarity corresponding to the target code, wherein the sliding window is configured to slide from a current window position to a next window position according to a target step size, and the target step size is equal to a length of the light source feature encoding sequence;

selecting a maximum similarity based on the similarities corresponding to the respective target codes in the light source feature encoding sequence as the similarity between the light source feature encoding sequence and the image feature encoding sequence.

9. The LED light source recognition method based on deep learning according to claim 8, wherein the target detection model is a trained YOLOv8 model, and further comprises:

training an initial YOLOv8 model based on a target loss function, and obtaining the trained YOLOv8 model;

wherein an intersection-over-union ratio adopted by a bounding box regression loss of the target loss function is an intersection-over-union ratio between widths of box1 and box2 on the width coordinate axis, box1 is a real rectangular box of a sample, and box2 is a rectangular box predicted by a model for the sample.

10. An electronic apparatus, comprising:
at least one storage configured to store a program; and
at least one processor configured to execute the program stored in the storage, wherein in response to the program stored in the storage being executed, the processor is configured to execute the method according to claim 9.

11. A non-transitory computer-readable storage medium, wherein the computer-readable storage medium stores a computer program, in response to the computer program running on a processor, the processor is caused to execute the method according to claim 9.

12. An electronic apparatus, comprising:
at least one storage configured to store a program; and
at least one processor configured to execute the program stored in the storage, wherein in response to the program stored in the storage being executed, the processor is configured to execute the method according to claim 8.

13. A non-transitory computer-readable storage medium, wherein the computer-readable storage medium stores a computer program, in response to the computer program running on a processor, the processor is caused to execute the method according to claim 8.

14. The LED light source recognition method based on deep learning according to claim 1, wherein the target detection model is a trained YOLOv8 model, and further comprises:

training an initial YOLOv8 model based on a target loss function, and obtaining the trained YOLOv8 model;

wherein an intersection-over-union ratio adopted by a bounding box regression loss of the target loss function is an intersection-over-union ratio between widths of box1 and box2 on the width coordinate axis, box1 is a real rectangular box of a sample, and box2 is a rectangular box predicted by a model for the sample.

15. An electronic apparatus, comprising:
at least one storage configured to store a program; and
at least one processor configured to execute the program stored in the storage, wherein in response to the program stored in the storage being executed, the processor is configured to execute the method according to claim 14.

16. A non-transitory computer-readable storage medium, wherein the computer-readable storage medium stores a computer program, in response to the computer program running on a processor, the processor is caused to execute the method according to claim 14.

17. An electronic apparatus, comprising:
at least one storage configured to store a program; and
at least one processor configured to execute the program stored in the storage, wherein in response to the program stored in the storage being executed, the processor is configured to execute the method according to claim 1.

18. A non-transitory computer-readable storage medium, wherein the computer-readable storage medium stores a computer program, in response to the computer program running on a processor, the processor is caused to execute the method according to claim 1.

19. An LED light source recognition device based on deep learning, comprising:

a sample collecting module configured to obtain a spline frame through a CMOS camera in an LED lighting environment, wherein the spline frame is an image having dark stripes;

a target detection module configured to input the spline frame into the target detection model, wherein a dark stripe detection result output by the target detection model is obtained, the dark stripe detection result comprises multiple rectangular boxes and a predicted classification corresponding to each of the rectangular boxes, and the rectangular boxes are configured to mark dark stripe located areas or non-dark stripe located areas;

a preprocessing module configured to preprocess the multiple rectangular boxes to obtain multiple preprocessed rectangular boxes, wherein the respective preprocessed rectangular boxes do not overlap with or separate from each other;

an encoding module configured to determine an image feature encoding sequence of the spline frame based on the predicted classification corresponding to each of the preprocessed rectangular boxes;

a comparison module configured to compare the image feature encoding sequence with a light source feature encoding sequence corresponding to each LED light source, wherein the light source feature encoding sequence best matching the spline frame is determined, and the light source feature encoding sequence is configured to mark the LED light source;

wherein each of the LED light sources in the LED lighting environment performs lighting based on a switching frequency $f_i$ and a duty cycle, i represents a given number of the LED light source, the respective LED light sources use different switching frequencies, the respective LED light sources use different duty cycles, $f_i < W/S$, S represents a shutter duration of the CMOS camera, the CMOS camera collects the image in a column-by-column scanning manner, and W represents a width of the image collected by the CMOS camera; the light source feature encoding sequence corresponding to the LED light source is determined based on the shutter duration, the width of the image, and the switching frequency and the duty cycle adopted by the LED light source;

wherein the light source feature encoding sequence lSequence$_i$ is formed by $$\left\lfloor \frac{W}{f_i \times S} \times \frac{\beta_i}{\beta_i + 1} \right\rfloor$$

consecutive 0s and $$\left\lceil \frac{W}{f_i \times S} \times \frac{1}{\beta_i + 1} \right\rceil$$

consecutive 1s, $$\left\lceil \frac{W}{f_i \times S} \times \frac{1}{\beta_i + 1} \right\rceil$$

refers to a smallest integer larger than $$\frac{W}{f_i \times S} \times \frac{1}{\beta_i + 1}, \left\lfloor \frac{W}{f_i \times S} \times \frac{\beta_i}{\beta_i + 1} \right\rfloor$$

refers to a largest integer less than $$\frac{W}{f_i \times S} \times \frac{\beta_i}{\beta_i + 1},$$

and $\beta_i$ represents the duty cycle;

wherein preprocessing the multiple rectangular boxes to obtain the plurality of preprocessed rectangular boxes comprises:

performing normalization processing on the multiple rectangular boxes to obtain multiple normalized rectangular boxes;

arranging sequentially the multiple normalized rectangular boxes in an ascending order along an image width coordinate axis to obtain a rectangular box sequence;

performing a rectangular box removal process is based on the rectangular box sequence to obtain a rectangular box sequence after the removal process, wherein the rectangular box removal process is configured to remove a rectangular box with a small mean average precision in a target adjacent group for each of the target adjacent groups, and the target adjacent group comprises two adjacent rectangular boxes and the two rectangular boxes have same predicted classification;

performing an elimination process on overlapping areas or separation areas based on the rectangular box sequence after the removal process to obtain the multiple preprocessed rectangular boxes;

wherein performing the elimination process on the overlapping areas or the separation areas based on the rectangular box sequence after the removal process to obtain the multiple preprocessed rectangular boxes comprises:

for any two adjacent rectangular boxes in the rectangular box sequence after the removal process, in response to the two rectangular boxes being overlapped on the image width coordinate axis, moving forward a rear boundary of a former rectangular box in the two rectangular boxes along the image width coordinate axis, wherein a distance moved forward is $$W_{overlap} \times \frac{mAPbefore}{mAPbefore + mAPafter};$$

moving backward a front border of a latter rectangular box in the two rectangular boxes along the image width coordinate axis, wherein a distance moved backward is $$W_{overlap} \times \frac{mAPafter}{mAPbefore + mAPafter};$$

wherein $W_{overlap}$ represents a width of an overlapping area between the two rectangular boxes, mAPbefore represents a mean average precision of the former rectangular box, and mAPafter represents a mean average precision of the latter rectangular box;

wherein performing the elimination process on the overlapping areas or the separation areas based on the rectangular box sequence after the removal process to obtain the multiple preprocessed rectangular boxes comprises:

for any two adjacent rectangular boxes in the rectangular box sequence after the removal process, in response to the two rectangular boxes being separated on the image width coordinate axis, moving backward a rear boundary of a former rectangular box in the two rectangular boxes along the image width coordinate axis, wherein a distance moved backward is $$W_{Separation} \times \frac{mAPbefore}{mAPbefore + mAPafter};$$

moving forward a front border of a latter rectangular box in the two rectangular boxes along the image width coordinate axis, wherein a distance moved forward is $$W_{Seperation} \times \frac{mAPafter}{mAPbefore + mAPafter};$$

wherein $W_{Separation}$ represents a width of a separation area between the two rectangular boxes, mAPbefore represents a mean average precision of the former rectangular box, and mAPafter represents a mean average precision of the latter rectangular box.

* * * * *